US009340252B2

(12) United States Patent
Mochizuki et al.

(10) Patent No.: US 9,340,252 B2
(45) Date of Patent: May 17, 2016

(54) SUSPENSION DEVICE

(71) Applicant: KAYABA INDUSTRY CO., LTD., Tokyo (JP)

(72) Inventors: Takahisa Mochizuki, Gifu (JP); Naoki Ito, Gifu (JP); Keiji Saito, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/419,977

(22) PCT Filed: Mar. 14, 2014

(86) PCT No.: PCT/JP2014/056862
§ 371 (c)(1),
(2) Date: Feb. 6, 2015

(87) PCT Pub. No.: WO2014/156716
PCT Pub. Date: Oct. 2, 2014

(65) Prior Publication Data

US 2015/0197307 A1 Jul. 16, 2015

(30) Foreign Application Priority Data

Mar. 27, 2013 (JP) ................................ 2013-065544

(51) Int. Cl.
*F16F 15/03* (2006.01)
*B62K 25/08* (2006.01)
*F16F 9/53* (2006.01)
*F16F 13/00* (2006.01)

(52) U.S. Cl.
CPC ................ *B62K 25/08* (2013.01); *F16F 9/535* (2013.01); *F16F 13/007* (2013.01); *F16F 2230/04* (2013.01)

(58) Field of Classification Search
CPC ............ F16F 9/53; F16F 9/532; F16F 9/535; F16F 9/36; F16F 9/362; F16F 13/007
USPC ......... 188/267, 267.1, 267.2, 322.16, 322.17; 267/195, 217, 218, 221
See application file for complete search history.

(56) References Cited

FOREIGN PATENT DOCUMENTS

| | | |
|---|---|---|
| JP | 2009-216210 A | 9/2009 |
| JP | 2010-159018 A | 7/2010 |
| JP | 2010-223282 A | 10/2010 |
| JP | 2012-067776 A | 4/2012 |

*Primary Examiner* — Robert A Siconolfi
*Assistant Examiner* — Vu Q Nguyen
(74) *Attorney, Agent, or Firm* — Rabin & Berdo, P.C.

(57) ABSTRACT

A suspension device interposed between a vehicle body and a wheel includes a shock absorber, a suspension spring, a tube member accommodating the shock absorber and the suspension spring, a sealing member closing a one-side opening of the tube member and holding a piston rod of the shock absorber, a damping force adjustment portion, which includes a coil generating a magnetic field in a passage and a wiring penetrating the piston rod and the sealing member and conducting the coil, electrically adjusting resistance caused when an operating fluid, which is a magnetic viscous fluid whose viscosity changes by a magnetic field's action, passes through the passage allowing two chambers defined and formed by a piston in a cylinder to communicate with each other in the shock absorber, and a reaction force adjustment portion, which is mounted on the sealing member, for adjusting a reaction force of the suspension spring.

3 Claims, 6 Drawing Sheets

VEHICLE BODY SIDE
52 6 100 60 F C3 4 C4 61 C5 8 62 T 51 t1 2 S B1 5 20 D 1 r1 10 32 31 50 3 L 30 B2 C1 r2 C2 t2 7
WHEEL SIDE

SUSPENSION DEVICE

TECHNICAL FIELD

The present invention relates to a suspension device.

BACKGROUND ART

A suspension device is interposed between a vehicle body and a wheel in a vehicle in general. In the suspension device, a suspension spring for elastically supporting the vehicle body and a shock absorber generating a damping force for suppressing an extension/contraction motion of this suspension spring are provided in parallel. The suspension device suppresses transmission of an impact caused by irregularity on a road surface to the vehicle body and makes riding comfort of the vehicle favorable.

In the suspension device called a front fork suspending a front wheel of a saddle type vehicle such as a bicycle, a tricycle and the like, a telescopic tube member composed of an outer tube and an inner tube going into/out of this outer tube is stood on both sides of the front wheel. The shock absorber and the suspension spring are accommodated in these tube members, and openings on a vehicle body side and a wheel side of the tube member are closed by a pair of sealing members in general.

As disclosed in JP2010-159018A and JP2012-67776A, the front forks include a type in which the damping force generated by the shock absorber is electrically adjusted. In the front fork disclosed in JP2012-67776A, the shock absorber and a damping force adjustment portion for electrically adjusting the damping force generated by this shock absorber are provided on one of the pair of tube members standing on both sides of the front wheel. Moreover, a suspension spring and a reaction force adjustment portion for adjusting a reaction force of this suspension spring are provided on the other of the pair of tube members. This front fork can electrically adjust the damping force as the front fork as a whole and can also adjust the reaction force of the suspension spring by an adjuster.

SUMMARY OF INVENTION

In the front fork disclosed in JP2012-67776A, the damping force adjustment portion includes a push rod inserted into a piston rod of the shock absorber, a valve body, an actuator for driving the push rod and the valve body in conduction. And this actuator is mounted on a sealing member for holding the piston rod. Thus, it was difficult to ensure a space for mounting the reaction force adjustment portion for adjusting the reaction force of the suspension spring on the sealing member.

The present invention has an object to provide a suspension device capable of mounting the reaction force adjustment portion for adjusting the reaction force of the suspension spring on the sealing member for holding the piston rod of the shock absorber which can electrically adjust the damping force.

The suspension device according to an aspect of the present invention is a suspension device interposed between a vehicle body and a wheel. The suspension device includes a shock absorber in which an operating fluid is sealed and provided with a cylinder, a piston rod going into and out of the cylinder, a piston held by the piston rod and defining two chambers formed in the cylinder, the operating fluid filled in the two chambers, and a passage formed in the piston and allowing the two chambers to communicate with each other, a suspension spring formed of a coil spring urging the shock absorber in an extension direction, a tube member composed of an outer tube and an inner tube going into and out of the outer tube and accommodating the shock absorber and the suspension spring, a sealing member closing a one-side opening of the tube member and for holding the piston rod, a damping force adjustment portion for electrically adjusting resistance caused when the operating fluid passes through the passage, and a reaction force adjustment portion for adjusting a reaction force of the suspension spring, in which the operating fluid is a magnetic viscous fluid whose viscosity changes by an action of a magnetic field, the damping force adjustment portion includes a coil mounted on the piston and for generating a magnetic field in the passage and a wiring penetrating the piston rod and the sealing member and conducting the coil, and the reaction force adjustment portion is mounted on the sealing member.

DESCRIPTION OF EMBODIMENTS

Figure 1:
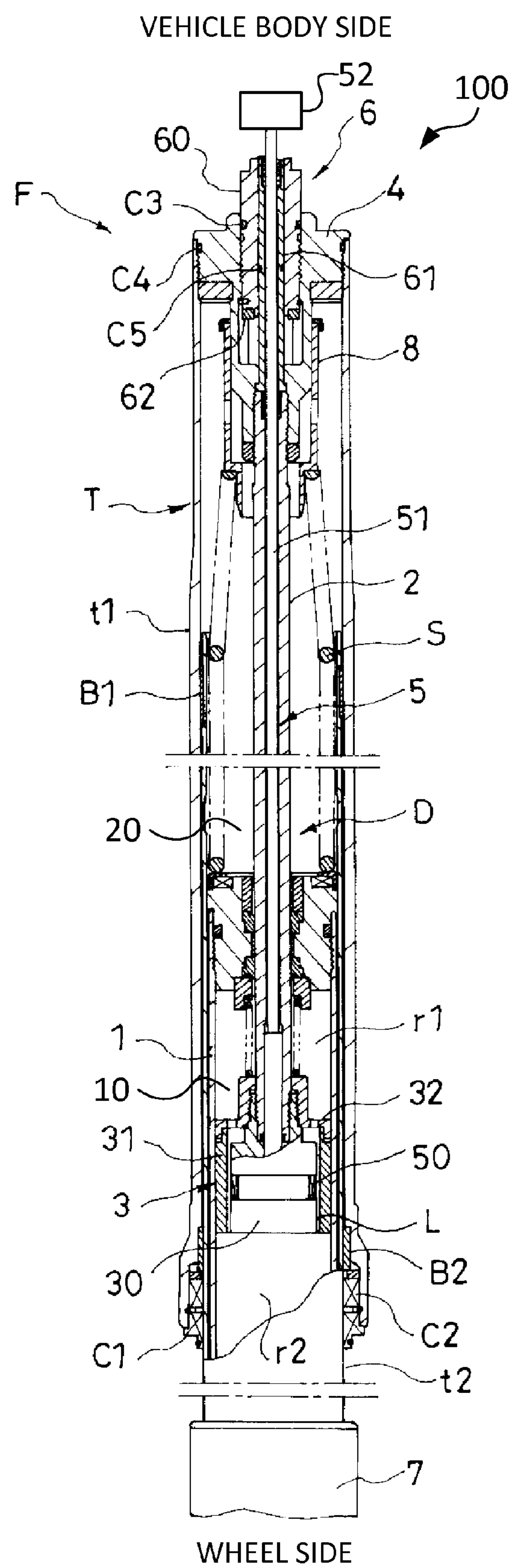
FIG. 1 is a front view illustrating a major part of a front fork which is a suspension device according to an embodiment of the present invention in a partially broken manner.

An embodiment of the present invention will be described below by referring to the attached drawings. The same reference numerals given throughout some drawings indicate the same components.

As illustrated in FIG. 1, a suspension device 100 according to this embodiment includes a shock absorber D in which an operating fluid 10 is sealed, a suspension spring S formed of a coil spring urging the shock absorber D in an extension direction, a tube member T composed of an outer tube t1 and an inner tube t2 going into/out of the outer tube t1 and accommodating the shock absorber D and the suspension spring S, a sealing member 4 for closing a one-side opening of the tube member T and holding a piston rod 2, a damping force adjustment portion 5 for electrically adjusting resistance caused when the operating fluid 10 passes through a passage L, and a reaction force adjustment portion 6 for adjusting a reaction force of the suspension spring S. The shock absorber D includes a cylinder 1, the piston rod 2 going into/out of the cylinder 1, a piston 3 held by the piston rod 2 and defining two chambers, that is, the chamber r1 and the chamber r2 formed in the cylinder 1, the operating fluid 10 filled in the two chambers r1 and r2, and the passage L formed in the piston 3 and allowing the two chambers r1 and r2 to communicate with each other. The suspension device 100 is interposed between a vehicle body and a wheel.

The operating fluid 10 is a magnetic viscous fluid whose viscosity changes by an action of a magnetic field. The damping force adjustment portion 5 includes a coil 50 mounted on the piston 3 and generating a magnetic field in the passage L and a wiring 51 penetrating the piston rod 2 and the sealing member 4 and conducting the coil 50. The reaction force adjustment portion 6 is mounted on the sealing member 4.

Explaining below in detail, the suspension device 100 is a front fork suspending a front wheel of a saddle type vehicle such as a bicycle, a tricycle and the like. The front fork includes a pair of leg portions supporting the front wheel from both sides. In FIG. 1, only one leg portion F of the pair of leg portions is illustrated, while the other leg portion is not shown. The leg portion F includes the telescopic type tube member T composed of the outer tube t1 and the inner tube t2, the shock absorber D accommodated in the tube member T, the suspension spring S accommodated in the tube member T, urging the shock absorber D in an extension direction, and elastically supporting the vehicle body, the damping force adjustment portion 5 for adjusting a damping force generated by the shock absorber D, and the reaction force adjustment portion 6 for adjusting the reaction force of the suspension spring S. The suspension device 100 can have one of or both of the pair of leg portions as the leg portion F. The suspension device 100 may be a rear cushion suspending a rear wheel of the saddle type vehicle or a suspension device for other vehicles.

Inside the shock absorber D, the operating fluid 10 made of the magnetic viscous fluid is sealed as described above. As described above, the shock absorber D using the magnetic viscous fluid as the operating fluid 10 is referred to as a magnetic viscous fluid shock absorber or an MR shock absorber. Regarding the magnetic viscous fluid shock absorber or MR shock absorber, various configurations are disclosed. The configuration of the shock absorber D can be changed as appropriate and one example thereof is shown below.

In this embodiment, the shock absorber D is set to a single-rod upright type. In the shock absorber D set as above, the piston rod 2 is stood on a side of the vehicle body of the piston 3, extending to an outside of the cylinder 1 and connected to the sealing member 4, and the cylinder 1 is connected to a sealing member 7. The sealing member 4 is a sealing member on a side of the vehicle body closing a vehicle-body side opening of the tube member T and is a cap member closing the vehicle-body side opening of the tube member T. The sealing member 7 is a sealing member on the wheel side closing the wheel-side opening of the tube member T. Moreover, the shock absorber D is set to a single cylinder type. The shock absorber D set as above includes a gas chamber, not shown, for compensating for a change in an in-cylinder capacity for a volume of a portion of the piston rod going into/out of the cylinder 1 and a free piston, not shown, defining this gas chamber in the cylinder 1. In other words, the above-described gas chamber compensates for the change in the capacity in the cylinder 1 according to the volume for a portion of the piston rod 2 going into/out of the cylinder 1.

The piston 3 includes a piston assy 30, a ring 31, and a plate 32. The piston assy 30 is screwed with an outer periphery of a distal end portion of the piston rod 2. Around an outer periphery of the piston assy 30, the coil 50 is wound. The ring 31 has an annular shape. The ring 31 is arranged on the outer periphery of the piston assy 30 and forms the passage L between the piston assy 30 and itself. The plate 32 has an annular shape and connects the ring 31 to the piston assy 30. The piston assy 30 and the ring 31 are both formed of a magnetic body. The passage L is made of an annular gap formed between the piston assy 30 and the ring 31. The plate 32 has a vertically penetrating hole (without reference numeral) formed so that communication between the two chambers r1 and r2 in the passage L is not prevented.

The magnetic viscous fluid is a liquid in which particles having ferromagnetism are distributed and becomes highly viscous by an action of the magnetic field. The liquid is such as oil and the like. Viscosity of the magnetic viscous fluid is changed in accordance with intensity of the magnetic field and returns to an original state if the magnetic field is removed. The magnetic viscous fluid is filled in the two chambers r1 and r2 in the cylinder 1 and does not leak to the outside of the cylinder 1. In the two chambers r1 and r2, the chamber formed on an upper side in FIG. 1 of the piston 3 is also referred to as a rod-side chamber r1 and the chamber formed on a lower side in FIG. 1 of the piston 3 is also referred to as a piston-side chamber r2 below.

At the time of extension of the shock absorber D when the piston rod 2 retreats from the cylinder 1, the magnetic viscous fluid in the rod-side chamber r1 pressurized by the piston 3 passes through the passage L and moves to the piston-side chamber r2. At the time of compression of the shock absorber D when the piston rod 2 enters into the cylinder 1, the magnetic viscous fluid in the piston-side chamber r2 pressurized by the piston 3 passes through the passage L and moves to the rod-side chamber r1. Thus, the shock absorber D generates a damping force caused by resistance of the magnetic viscous fluid passing through the passage L at the time of extension/contraction.

The damping force adjustment portion 5 includes a controller 52 in addition to the coil 50 and the wiring 51. The controller 52 is connected to the wiring 51. The controller 52 is provided on an outer side of the tube member T. Thus, a part of the wiring 51 passes inside the piston rod 2 and inside the sealing member 4 holding the piston rod 2 and extends to an outside of the tube member T. The damping force adjustment portion 5 generates a magnetic field in the passage L by conducting the coil 50. When the magnetic field is generated in the passage L, the viscosity of the magnetic viscous fluid flowing through the passage L changes. Thus, resistance caused when the magnetic viscous fluid flows through the passage L changes. Therefore, the damping force adjusting portion 5 can electrically adjust the damping force generated by the shock absorber D by generating the magnetic field in the passage L. A current amount flowing through the coil 50 may be adjusted in accordance with a control rule by the controller 52 or may be adjusted in multi stages or continuously by an operation of a user.

Between the tube member T and the shock absorber D, a lubricant liquid 20 and a suspension spring S are accommodated. The lubricant liquid 20 lubricates sliding surface of a pair of bush B1 and bush B2 pivotally supporting the inner tube t2, capable of going into/out of the outer tube t1. An upper opening of the tube member T in FIG. 1 is closed by the sealing member 4. A lower opening of the tube member T in FIG. 1 is closed by the sealing member 7. A lower opening of a cylindrical gap in FIG. 1 formed in an overlapping portion between the outer tube t1 and the inner tube t2 is closed by a seal member C1 and a seal member C2 made of a dust seal and an oil seal. Thus, the lubricant liquid 20 does not leak to the outside air side from the lower opening in FIG. 1 in the above-described cylindrical gap.

The tube member T is connected to a vehicle body frame which forms a frame of the vehicle body through a vehicle-body side bracket, not shown, mounted on the outer tube t1 and is connected to an axle of the front wheel through the sealing member 7. The suspension device 100 is set to an inverted type by the tube member T connected as above. The suspension device 100 may be set to an upright type by connecting the inner tube t2 to the vehicle body side and by connecting the outer tube t1 to the wheel side.

Figure 2:
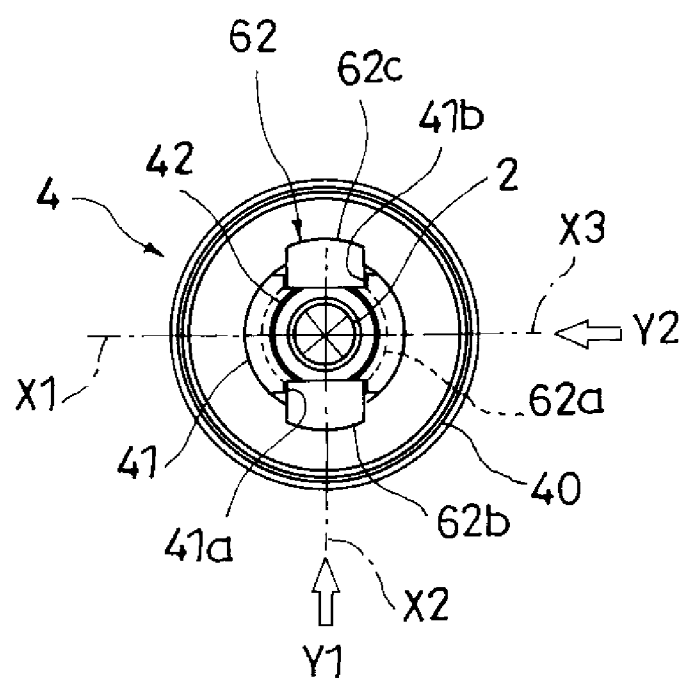
FIG. 2 is bottom view illustrating a part provided with a sealing member on a vehicle body side in FIG. 1 in an enlarged manner.
Figure 3A:
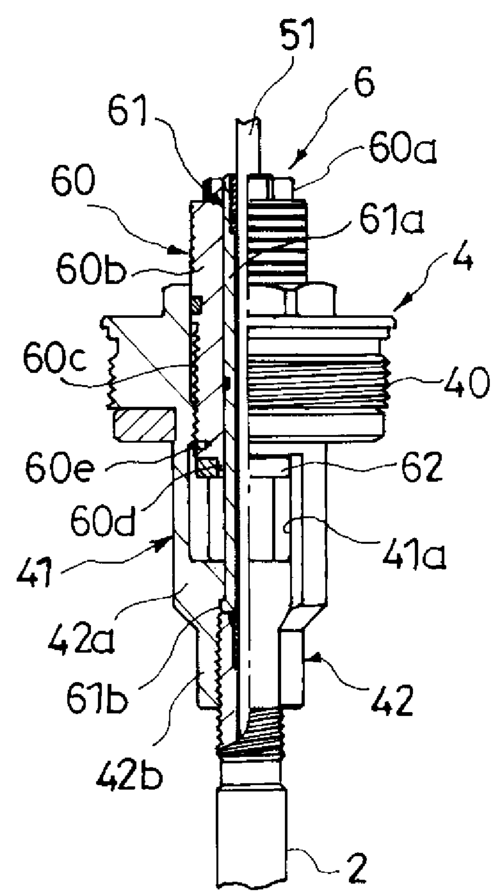
FIG. 3A is a view illustrating a state in which a reaction force of a suspension spring is adjusted by a reaction force adjustment portion to the minimum and is a Y1 arrow view when the part provided with the sealing member on the vehicle body side is broken on X1-X2 line in FIG. 2.
Figure 3B:
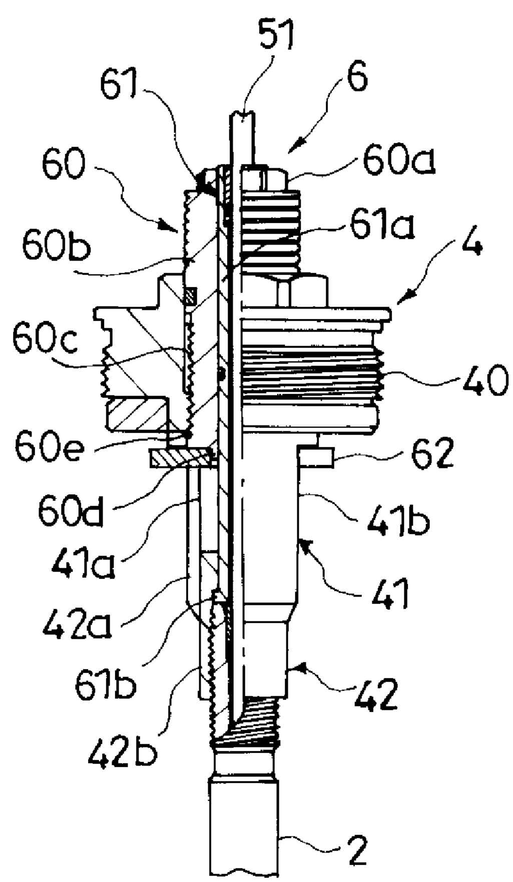
FIG. 3B is a view illustrating a state in which a reaction force of a suspension spring is adjusted by a reaction force adjustment portion to the minimum and is a Y2 arrow view when the part provided with the sealing member on the vehicle body side is broken on X2-X3 line in FIG. 2.
Figure 4A:
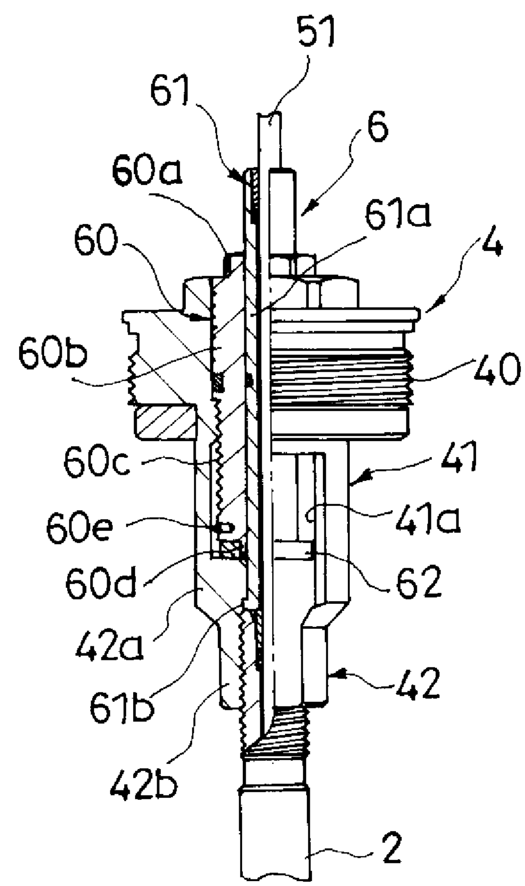
FIG. 4A is a view illustrating a state in which a reaction force of a suspension spring is adjusted by a reaction force adjustment portion to the maximum and is the Y1 arrow view when the part provided with the sealing member on the vehicle body side is broken on X1-X2 line in FIG. 2.
Figure 4B:
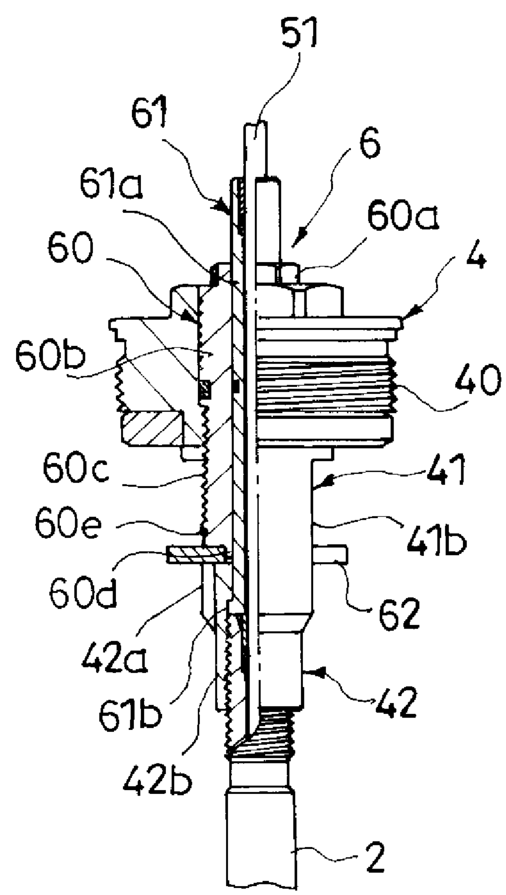
FIG. 4B is a view illustrating a state in which a reaction force of a suspension spring is adjusted by a reaction force adjustment portion to the maximum and is the Y2 arrow view when the part provided with the sealing member on the vehicle body side is broken on X2-X3 line in FIG. 2.

FIG. 2 is a bottom view of a part provided with the sealing member 4. The part provided with the sealing member 4 illustrated in FIG. 1 corresponds to a Y1 arrow view broken on X1-X3 line in FIG. 2. FIG. 3A and FIG. 4A illustrate Y1 arrow views when the part provided with the sealing member 4 is broken on X1-X2 line in FIG. 2. FIG. 3B and FIG. 4B illustrate Y2 arrow views when the part provided with the sealing member 4 is broken on X2-X3 line in FIG. 2.

The sealing member 4 includes a sealing portion 40, a guide portion 41, and a rod holding portion 42. The sealing portion 40 is formed annularly and is screwed, or in other words screw-connected, with the tube member T. Specifically, the sealing portion 40 is screwed with an inner periphery of an upper end portion of the outer tube t1. The guide portion 41 extends from the sealing portion 40 to lower sides in FIG. 3A, FIG. 3B, FIG. 4A and FIG. 4B, that is, to the tube member T side and has a pair of openings 41*a* and 41*b* on side parts. The rod holding portion 42 extends from the guide portion 41 to the lower sides in FIG. 3A, FIG. 3B, FIG. 4A and FIG. 4B, that is, to the tube member T side and holds the piston rod 2. The sealing portion 40, the guide portion 41, and the rod holding portion 42 are arranged coaxially.

The guide portion 41 is formed so as to have a diameter smaller than the sealing portion 40. As illustrated in FIG. 1, a spring receiver 8 is arranged on an outer periphery of the guide portion 41 and supports an upper end of the suspension spring S. The spring receiver 8 has a cylindrical shape and can move in the axial direction. The opening 41*a* and the opening 41*b* extend at an equal interval along the axial direction of the guide portion 41 and arranged symmetrically.

The rod holding portion 42 includes a stopper portion 42*a* and a nut portion 42*b*. The stopper portion 42*a* continues to the guide portion 41. An inner diameter of the nut portion 42*b* is formed smaller than an inner diameter of the guide portion 41. The nut portion 42*b* continues to the lower sides of the stopper portion 42*a* in FIG. 3A, FIG. 3B, FIG. 4A, and FIG. 4B, that is, to a side opposite to the guide portion 41 side and has an inner diameter formed larger than the inner diameter of the stopper portion 42*a*. The piston rod 2 is screwed with an inner periphery of the nut portion 42*b* and is positioned when a distal end thereof is pressed onto the stopper portion 42*a* through a wiring guide 61 which will be described later.

The reaction force adjustment portion 6 includes an adjuster 60, a wiring guide 61, and a support piece 62. The adjuster 60 has an annular shape and is screwed, or in other words screw-connected, with an inner periphery of the sealing portion 40. The wiring guide 61 has a cylindrical shape and is inserted into an inside of the adjuster 60. The support piece 62 is inserted into the guide portion 41 and driven by the adjuster 60 in the axial direction. The adjuster 60, the wiring guide 61, and the support piece 62 are arranged on a center line of the sealing member 4.

The adjuster 60 includes a knob 60*a*, a shaft portion 60*b*, a screw portion 60*c*, and a distal end portion 60*d*. On an outer periphery of the knob 60*a*, a width across flat part is formed. This width across flat part facilitates rotation of the adjuster 60 using a tool. The shaft portion 60*b* continues to the lower sides of the knob 60*a* in FIG. 3A, FIG. 3B, FIG. 4A, and FIG. 4B, that is, to the tube member T side. The screw portion 60*c* continues to the lower sides of the shaft portion 60*b* in FIG. 3A, FIG. 3B, FIG. 4A, and FIG. 4B, that is, to the tube member T side and is screwed with the inner periphery of the sealing portion 40. The screw portion 60*c* screwed, or in other words screw-connected, with the sealing portion 40 enables insertion of the adjuster 60 into the sealing member 4 and retreat of the adjuster 60 from the sealing member 4 in accordance with a rotation direction of the adjuster 60. The distal end portion 60*d* continues to the lower sides of the screw portion 60*c* in FIG. 3A, FIG. 3B, FIG. 4A, and FIG. 4B, that is, to the tube member T side and formed so as to have a diameter smaller than the screw portion 60*c*. The distal end portion 60*d* extends to an anti-cap member side from the screw portion 60*c*, that is, to a side opposite to the sealing member 4. Therefore, the distal end portion 60*d* extends from the screw portion 60*c* to the tube member T side. The knob 60*a*, the shaft portion 60*b*, the screw portion 60*c*, and the distal end portion 60*d* continue coaxially. On the lower sides of the screw portion 60*c* in FIG. 3A, FIG. 3B, FIG. 4A, and FIG. 4B, that is, on an outer periphery of an end portion on the tube member T side, a stopper ring 60*e* is mounted. The stopper ring 60*e* prevents removal of the adjuster 60.

As illustrated in FIG. 1, a space between the adjuster 60 and the sealing member 4 and a space between the sealing member 4 and the outer tube t1 are sealed by annular O-ring C3 and O-ring C4, respectively. Thus, the lubricant liquid 20 does not leak from between the adjuster 60 and the sealing member 4 and between the sealing member 4 and the outer tube t1.

The wiring guide 61 includes, as illustrated in FIG. 3A, FIG. 3B, FIG. 4A, and FIG. 4B, a cylindrical body 61*a* and a flange portion 61*b*. The cylindrical body 61*a* is formed in a cylindrical shape and penetrates the adjuster 60. The flange portion 61*b* has an annular shape and extends to an outside from the cylindrical body 61*a*. The flange portion 61*b* specifically extends to the outer side from lower ends of the cylindrical body 61*a* in FIG. 3A, FIG. 3B, FIG. 4A, and FIG. 4B, that is, from the end on the tube member T side. Inside the wiring guide 61, a wiring 51 passes.

An outer diameter of the flange portion 61*b* is formed so as to be larger than an inner diameter of the stopper portion 42*a*. Thus, when the wiring guide 61 is inserted into the sealing member 4 from below with the cylindrical body 61*a* above, the flange portion 61*b* abuts against the stopper portion 42*a*. Then, by screwing the piston rod 2 with the nut portion 42*b*, the flange portion 61*b* is sandwiched between the stopper portion 42*a* and the piston rod 2. As a result, the wiring guide 61 is fixed to the sealing member 4. Therefore, when the adjuster 60 is rotated, the adjuster 60 moves in the axial direction between the sealing member 4 and the wiring guide 61, but the wiring guide 61 is not moved so that a load is not applied to the wiring 51. The wiring guide 61 fixed as described above specifically extends to the rod holding portion 42 and is fixed to the rod holding portion 42.

A space between the wiring guide 61 and the adjuster 60 is sealed by an annular O-ring C5 as illustrated in FIG. 1. Thus, the lubricant liquid 20 does not leak from between the wiring guide 61 and the adjuster 60. Moreover, a space between the wiring guide 61 and the wiring 51 and a space between the piston rod 2 and the wiring 51 are also sealed by an annular O-ring (without reference numeral). Thus, the lubricant liquid 20 does not enter into the wiring guide 61 or the piston rod 2 from between the wiring guide 61 and the wiring 51 and between the piston rod 2 and the wiring 51.

As illustrated in FIG. 2, the support piece 62 includes an annular portion 62*a* and a pair of support portion 62*b* and support portion 62*c*. The annular portion 62*a* is formed in an annular plate shape and inserted into the guide portion 41. The annular portion 62*a* can move in the axial direction in the guide portion 41. The support portion 62*b* and the support portion 62*c* protrude from the annular portion 62*a* to the outside. The support portion 62*b* and the support portion 62*c* are arranged symmetrically, penetrate the opening 41*a* and the opening 41*b* and extend to an outer side of the guide portion 41. Therefore, the support portion 62*b* and the support portion 62*c* protrude to the outer side from the opening 41*a* and the opening 41*b*.

As illustrated in FIG. 3A, FIG. 3B, FIG. 4A, and FIG. 4B, the cylindrical body 61*a* is inserted into the annular portion 62*a*. Thus, in the annular portion 62*a*, the wiring 51 is inserted. Between the cylindrical body 61*a* and the annular portion 62*a*, the distal portion 60*d* is inserted. With an upper side of the annular portion 62*a*, the screw portion 60*c* is brought into contact. An outer diameter of the annular portion 62*a* is formed larger than an inner diameter of the stopper portion 42*a*. Thus, movement of the support piece 62 to the lower side is regulated by the stopper portion 42*a*.

With the lower sides of the support portion 62*b* and the support portion 62*c*, the cylindrical spring receiver 8 supporting an upper end of the suspension spring S is brought into contact, and the support piece 62 is pressed onto the adjuster 60 by a reaction force of the suspension spring S. Thus, as illustrated in FIG. 4A and FIG. 4B, by rotating the adjuster 60 and by inserting the adjuster 60 into the sealing member 4, the support piece 62 is pressed down and the suspension spring S is compressed. As a result, the reaction force of the suspension spring S becomes larger. Moreover, as illustrated in FIG. 3A and FIG. 3B, by rotating the adjuster 60 to an opposite side and by retreating the adjuster 60 from the sealing member 4, the support piece 62 is pushed up by the suspension spring S and the suspension spring S extends. As a result, the reaction force of the suspension spring S becomes smaller. The support piece 62 acting on the suspension spring S as above supports the one-side end portion of the suspension spring S by the support portion 62*b* and the support portion 62*c*. The support piece 62 specifically supports the one-side end portion of the suspension spring S by the support portion 62*b* and the support portion 62*c* through the spring receiver 8.

A working effect of the suspension device 100 will be explained below.

The suspension device 100 is interposed between the vehicle body and the wheel and includes the shock absorber D, the suspension spring S, the tube member T, the sealing member 4, the damping force adjustment portion 5, and the reaction force adjustment portion 6. The operating fluid 10 is a magnetic viscous fluid whose viscosity changes by an action of the magnetic field. The damping force adjustment portion 5 includes the coil 50 mounted on the piston 3 and generating the magnetic field in the passage L and the wiring 51 penetrating the piston rod 2 and the sealing member 4 and conducting the coil 50. The reaction force adjustment portion 6 is mounted on the sealing member 4.

According to the above-described configuration, since the shock absorber D is a magnetic viscous fluid shock absorber, the damping force generated by the shock absorber D can be electrically adjusted without mounting an actuator on the sealing member 4 for holding the piston rod 2. Thus, even if the damping force of the shock absorber D is made electrically adjustable, a space for mounting the adjuster 60 on the sealing member 4 for holding the piston rod 2 can be ensured, and the reaction force adjustment portion 6 can be mounted on the sealing member 4.

In this embodiment, the sealing member 4 is formed annularly and includes the sealing portion 40, the guide portion 41, and the rod holding portion 42. The reaction force adjustment portion 6 includes the adjuster 60, the wiring guide 61, and the support piece 62. The wiring 51 passes inside the wiring guide 61, and the wiring guide 61 extends to the rod holding portion 42 and is fixed to the rod holding portion 42. The support piece 62 includes the support portion 62*b* and the support portion 62*c* protruding from the opening 41*a* and the opening 41*b* to the outer side and supports the one-side end portion of the suspension spring S by the support portion 62*b* and the support portion 62*c*.

According to the above-described configuration, the wiring 51 can be protected by the wiring guide 61, and when the adjuster 60 and the support piece 62 move vertically, a load can be prevented from applying on the wiring 51. Therefore, by providing the adjuster 60 and the wiring 51 at the center of the sealing member 4, the structures of the sealing member 4 and the reaction force adjustment portion 6 can be prevented from becoming complicated. The configurations of the sealing member 4 and the reaction force adjustment portion 6 are not limited to the above and can be changed as appropriate. For example, the wiring 51 may be passed through the center of the sealing member 4, and the adjuster 60 may be provided by being shifted from the center of the sealing member 4. However, in this case, the structure becomes complicated, and thus, the numbers of working processes and components increase.

In this embodiment, the wiring guide 61 includes the cylindrical body 61*a* and the flange portion 61*b*, the rod holding portion 42 includes the stopper portion 42*a* and the nut portion 42*b*, and the flange portion 61*b* is sandwiched between the stopper portion 42*a* and the distal end of the piston rod 2 screwed, or in other words screw-connected, with the inner periphery of the nut portion 42*b*.

According to the above-described configuration, the wiring guide 61 can be easily fixed to the rod holding portion 42 of the sealing member 4. A fixing method of the wiring guide 61 is not limited to the above and can be changed as appropriate.

In this embodiment, the support piece 62 includes the annular portion 62*a*, the support portion 62*b*, and the support portion 62*c*, and the adjuster 60 includes the screw portion 60*c* and the distal end portion 60*d*.

According to the above-described configuration, lateral shifting of the adjuster 60 and the support piece 62 is suppressed, and the support piece 62 can be reliably moved vertically by the adjuster 60. The configurations and shapes of the adjuster 60 and the support piece 62 are not limited to the above and can be changed as appropriate.

In this embodiment, the sealing member 4 closes the opening on the upper side of the tube member T in FIG. 1, that is, the vehicle-body side opening. According to the above-described configuration, the shock absorber D is set to the upright type, and the wiring 51 passing through the piston rod 2 extends to above the spring. Thus, according to the above-described configuration, a load on the wiring 51 can be reduced.

The embodiment of the present invention has been explained but the above-described embodiment illustrates only a part of an application example of the present invention and is not intended to limit a technical scope of the present invention to the specific configuration of the above-described embodiment.

The sealing member holding the piston rod 2 may be a sealing member on the wheel side closing the opening on the wheel side of the tube member T. The suspension device 100 may be configured such that the shock absorber D is set to the inverted type, and the wiring 51 extends to below the spring.

The present application claims for priority based on Japanese Patent Application No. 2013-065544 filed with Japan Patent Office on Mar. 27, 2013 and all the contents of this application are incorporated in this description by reference.

The invention claimed is:

1. A suspension device interposed between a vehicle body and a wheel, comprising:

a shock absorber, in which an operating fluid is sealed therein, including a cylinder, a piston rod going into and out of the cylinder, a piston held by the piston rod and defining two chambers formed in the cylinder where the operating fluid is filled in the two chambers, and a passage formed in the piston and allowing the two chambers to communicate with each other;

a suspension spring made of a coil spring adapted to urge the shock absorber in an extension direction;

a tube member composed of an outer tube and an inner tube going into and out of the outer tube, the tube member adapted to accommodate the shock absorber and the suspension spring;

a sealing member adapted to close a one-side opening of the tube member and to hold the piston rod;

a damping force adjustment portion adapted to electrically adjust resistance caused when the operating fluid passes through the passage; and a reaction force adjustment portion adapted to adjust a reaction force of the suspension spring, wherein the operating fluid is a magnetic viscous fluid whose viscosity changes by an action of a magnetic field;

the damping force adjustment portion includes a coil mounted on the piston and adapted to generate the magnetic field in the passage, and a wiring adapted to penetrate the piston rod and the sealing member and to conduct electricity to the coil;

the reaction force adjustment portion is mounted on the sealing member;

the sealing member is formed annularly and includes a sealing portion screw-connected with the tube member, a guide portion extending from the sealing portion to a tube member side and having an opening on a side portion, and a rod holding portion extending from the guide portion to the tube member side and adapted to hold the piston rod;

the reaction force adjustment portion includes an annular adjuster screw-connected with an inner periphery of the sealing portion, a cylindrical wiring guide inserted into an inside of the adjuster, and a support piece inserted into the guide portion and driven in an axial direction by the adjuster;

the wiring passes inside the wiring guide;

the wiring guide extends to the rod holding portion and is fixed to the rod holding portion;

the support piece includes a support portion protruding from the opening of the guide portion to an outer side, the support piece being adapted to support a one-side end portion of the suspension spring by the support portion;

the wiring guide includes a cylindrical body formed in a cylindrical shape, and a flange portion extending from the cylindrical body to an outer side;

the rod holding portion includes a stopper portion continuing to the guide portion, and a nut portion continuing to a side opposite to a guide portion side of the stopper portion and formed so as to have an inner diameter larger than an inner diameter of the stopper portion; and the flange portion is sandwiched between the stopper portion and a distal end of the piston rod screw-connected with an inner periphery of the nut portion.

2. The suspension device according to claim 1, wherein the support piece includes an annular portion formed in an annular plate shape, having the wiring guide inserted inside and moving along an axial direction in the guide portion, the support piece further including a pair of support portions protruding as the support portions from the annular portion to an outer side; and the adjuster includes a screw portion screw-connected with the inner periphery of the sealing portion, and a distal end portion extending to a side opposite to the sealing member from the screw portion and inserted between the annular portion and the wiring guide.

3. The suspension device according to claim 1, wherein the sealing member closes a vehicle-body side opening of the tube member.

* * * * *